Aug. 16, 1966  E. D. WILKERSON  3,266,163

TORSION BAR HEIGHT GAUGE

Filed Dec. 12, 1962  2 Sheets-Sheet 1

INVENTOR
EDWARD D. WILKERSON

BY
Mason, Porter, Diller & Stewart
ATTORNEYS

Aug. 16, 1966  E. D. WILKERSON  3,266,163
TORSION BAR HEIGHT GAUGE
Filed Dec. 12, 1962  2 Sheets-Sheet 2
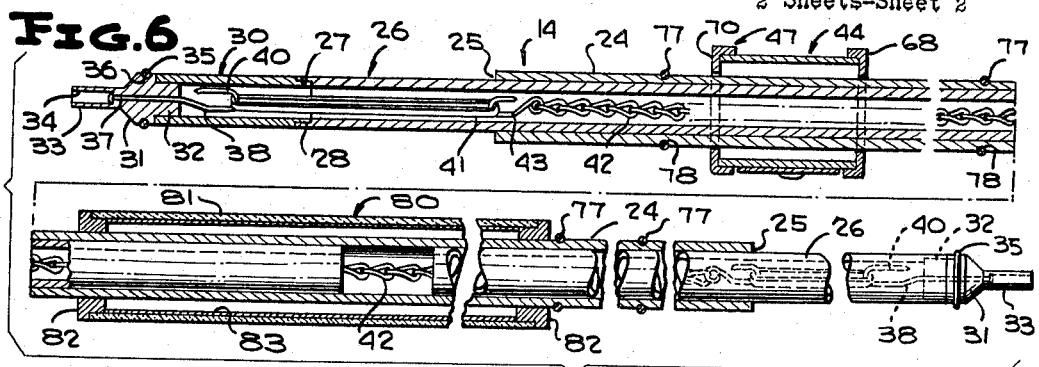
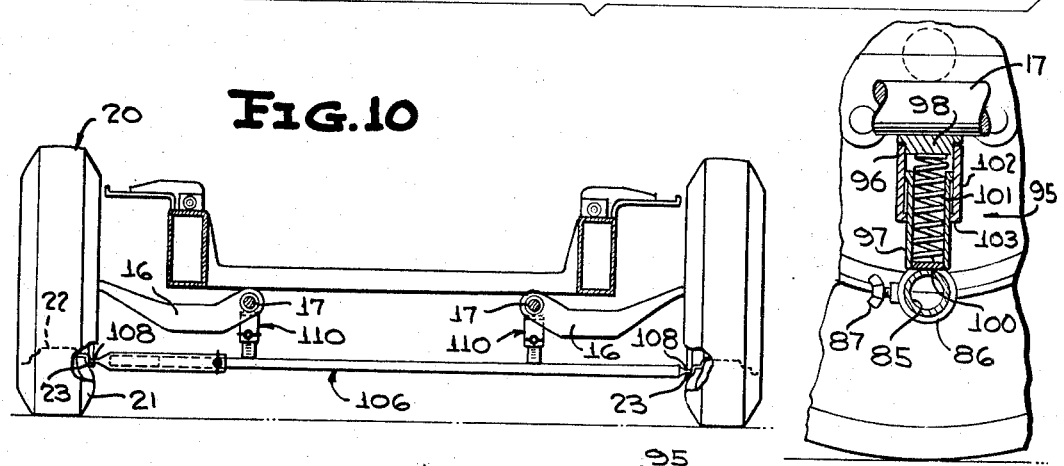
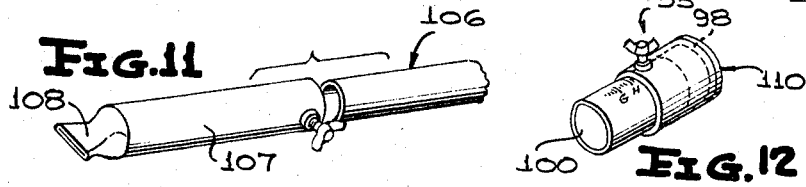
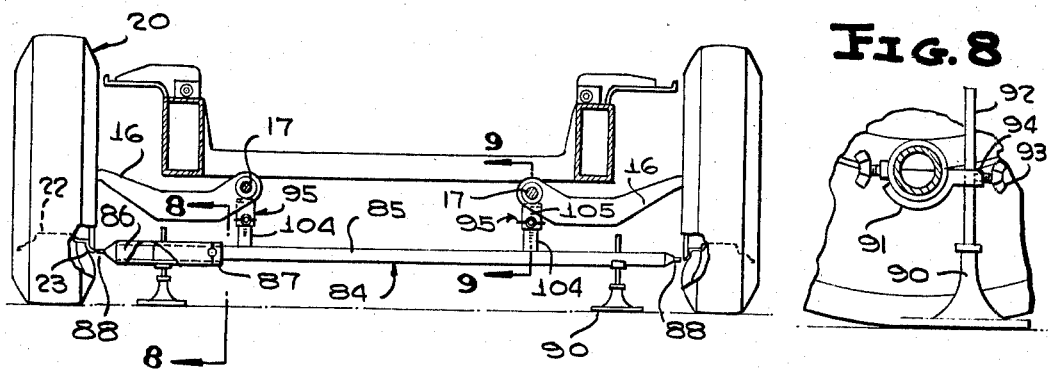
INVENTOR
EDWARD D. WILKERSON
BY Mason, Porter, Diller & Stewart
ATTORNEYS ced with this invention will now be described in detail.

United States Patent Office
3,266,163
Patented August 16, 1966

3,266,163
TORSION BAR HEIGHT GAUGE
Edward D. Wilkerson, 280 E. Northfield Road,
Livingston, N.J.
Filed Dec. 12, 1962, Ser. No. 244,164
21 Claims. (Cl. 33—181)

This invention relates to a novel torsion bar height gauge which utilizes sprung weight portions, as well as unsprung weight portions, of an automobile to indicate the correct height of torsion bars of an automobile.

An object of this invention is to provide a novel torsion bar height gauge comprising an elongated telescopic member having a reference element at each end thereof, the reference elements being adapted for alignment with an unsprung weight front end portion of an automobile, and a height gauge mechanism secured to the telescopic member and adapted for attachment to a sprung weight portion of the automobile whereby a correct torsion bar height of the automobile may be determined.

Another object of this invention is the provision of a novel torsion bar height gauge which has a pair of contact bodies adapted to be freely hung from the torsion bars of an automobile, an elongated telescopic member having a reference element at each end thereof suspended by the pair of contact arms, and each of the contact arms having a height gauge which is lockable in a preset position whereby any deviation between a preset height and the actual height of torsion bars may be determined by the comparison between each of the reference elements and an associated unsprung weight portion of the automobile.

A further object of this invention is to provide a novel torsion bar height gauge constructed in accordance with the above objects, and in addition, to construct the pair of contact arms for slidable engagement with the elongated telescopic member whereby the torsion bar height gauge may be used to measure torsion bars on different automobiles which are spaced at different distances from one another.

Another object of this invention is to provide a novel torsion bar height gauge including a main tubular member and tubular extension telescoped into the tubular member at opposite ends thereof, a pair of contact arms slidably mounted on the main tubular member and attachable to sprung weight portions of an automobile to provide free-hanging of the main tubular member, and wherein lockable height indicating means are provided on each contact arm for presetting a selected torsion bar height.

Still another object of this invention is the provision of a novel torsion bar height gauge of the character immediately above-mentioned wherein the tubular extensions are biased toward each other for preventing the accidental distortion of the torsion bar height gauge when an automobile to which the height gauge is attached is "flexed" during the measurement and adjusting of the torsion bars thereof.

A further object of this invention is to provide a novel torsion bar height gauge including a tubular member having an identical tubular extension telescoped into opposite ends of the tubular member whereby the entire height gauge may be turned 180° end-for-end and the accuracy thereof can thereby be instantly determined.

Yet another object of this invention is the provision of a novel torsion bar height gauge provided with a reference element at each end thereof defining a reference point whereby the torsion bar height gauge may be more accurately, easily and speedily handled.

Another object of this invention is the provision of a novel torsion bar height gauge having a main tubular member, a tubular extension telescoped at least at one end of the main tubular member, a reference element at the non-telescoped end of the tubular extension and a pair of spring biased contact bodies having magnetized end portions for attaching the main tubular body to the torsion bars of an automobile.

Another object of this invention is the provision of a novel torsion bar height gauge constructed in accordance with the last-mentioned object wherein each of the contact bodies includes first and second telescoped portions, one of the portions being provided with a plurality of height graduations while the other of said portions is provided with a reference index whereby each contact body may be preset to a particular torsion bar height.

Still another object of this invention is to provide a novel torsion bar height gauge constructed in accordance with the foregoing objects, and in addition, to provide a plurality of vertically adjustable stands having gauge supporting means whereby the torsion bar height gauge may be additionally supported and aligned with respect to an unsprung portion of an automobile to accurately determine the heights of automobile torsion bars.

Another object of this invention is the provision of a novel method of utilizing the sprung and unsprung weight portions of an automobile to determine the heights of torsion bars thereof by first establishing a reference height and comparing the reference height with the height of a sprung weight portion of an automobile.

With the above, and other objects in view that will hereinafter appear, the nature of the invention will be more clearly understood by reference to the following detailed description, the appended claims and the several views illustrated in the accompanying drawings:

In the drawings:

FIGURE 1 is a bottom perspective view of a front end of an automobile looking forwardly from the rear end of the automobile, and illustrates a novel torsion bar height gauge constructed in accordance with this invention attached in its position of use to a sprung weight portion of the front end assembly.

FIGURE 2 is a fragmentary elevational view, with parts broken away and removed for clarity, of a front end of an automobile with the torsion bar height gauge of this invention attached thereto, and illustrates a pair of contact arms slidably mounted on a main tubular member, spring means on each of the contact arms yieldably attached to a respective torsion bar of the automobile, and a tubular extension telescoped into the main tubular member, the tubular extension having a reference element at a non-telescoped end thereof in alignment with a lip of a wheel rim, the wheel rim lip being utilized as a height reference.

FIGURE 3 is an enlarged evelational view taken along line 3—3 of FIGURE 2, and illustrates a first portion of the contact body being secured by the spring means to a torsion bar and slidably received in a second portion of the contact body, the second portion of the contact body being, in turn, slidably mounted upon the main tubular member, and a clamping screw for securing the first and second portions of the contact body in a preselected relationship.

FIGURE 6 is a broken, sectional view taken through the axis of the torsion bar guage of FIGURE 2, and more clearly illustrates the relationship of the various elements of the torsion bar height gauge.

Figure 1:
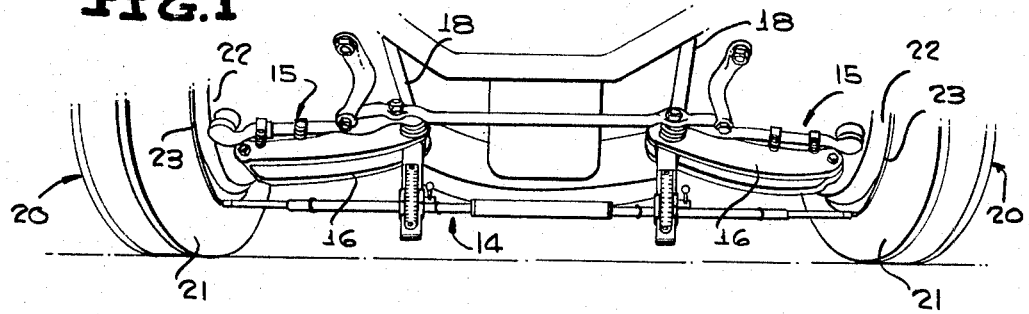

FIGURE 7 is a side elevational view, with parts removed and other parts shown in section for clarity, of a modified torsion bar height gauge, similar to the torsion bar height gauage of FIGURE 1, but differing therefrom in that the torsion bar height gauge is supported by a pair of vertically adjustable stands and includes a pair of adjustable contact bodies having magnetized first and second portions.

FIGURE 8 is an enlarged end elevational view taken along line 8—8 of FIGURE 7, and shows a gauge supporting bracket clamped to the vertical standard and providing auxiliary support for the torsion bar height gauge.

FIGURE 9 is an enlarged fragmentary sectional view taken through line 9—9 of FIGURE 7, and illustrates telescopic first and second portions of the contact body biased toward a torsion bar and a main tubular member of the torsion bar height gauge by a compression spring, and additionally illustrating a magnet at opposite ends of the contact body securing the same between the torsion bar and the main tubular member.

FIGURE 10 is a side elevational view of a modified torsion bar height gauge, similar to the torsion bar height gauge illustrated in FIGURE 7, but differing therefrom in that the torsion bar height gauge is auxiliary supported by a reference element at each end thereof resting upon a wheel rim lip.

FIGURE 11 is an enlarged exploded top perspective view of a portion of the torsion bar height gauge of FIGURE 10, and illustrates the telescopic relationship between the main tubular member and a tubular telescopic extension, and the construction of a reference element at an end of the tubular extension.

FIGURE 12 is an enlarged top perspective view of one of the contact bodies of the torsion bar height gauge of FIGURE 10, and shows the tubular telescopic construction thereof, and a plurality of height graduations on one portion of the contact body.

Figure 2:
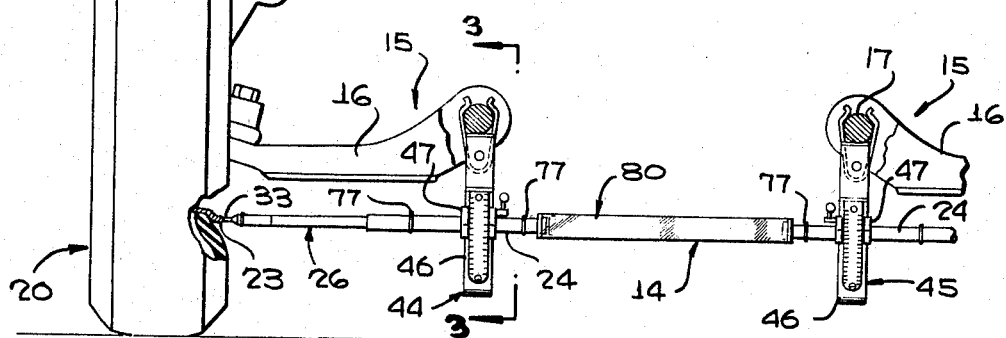

A torsion bar height gauge constructed in accordance with this invention is best illustrated in FIGURES 1, 2 and 6 of the drawings, and is generally designated by the reference numeral 14. With particular attention directed to FIGURES 1 and 2 of the drawings, the torsion bar height gauge 14 is shown attached in free-hanging relationship to a sprung weight, front end portion 15 of an automobile. Among other elements, the sprung weight, front end portion 15 of an automobile includes upper control arms (not shown), lower control arms 16, a pair of torsion bars 17 and their associated fulcrum arms or adjusting levers 18.

An unsprung weight portion of the automobile includes a pair of tires 21, a pair of wheel rims 22, and a pair of wheel rim lips 23. The unsprung weight portion 20 of the automobile is journalled to the sprung weight, front end portion 15 by a pair of spindles (not shown) in a manner well known in the automotive art.

Referring to FIGURES 2 through 6 of the drawings, the torsion bar height gauge 14 comprises an elongated main tubular member 24 having identical opposite open ends 25.

An identical tubular extension 26 is telescopically received through the identical open ends 25 into the main tubular member 24. The external diameters of the tubular extensions 26 are substantially equal to the internal diameter of the main tubular member 24, thereby assuring a relatively free sliding fit between the tubular extensions 26 and the main tubular member 24. An internal annular groove 27 in each of the tubular extensions 26 confiningly receives a socket portion 28 of a tubular extension end 30. The connection between the annular groove 27 and the socket portion 28 may be a sliding fit or a force fit, but preferably each socket portion 28 is threaded into its respective annular groove 27 whereby the tubular extension end 30 may be readily removed from the tubular extension 26 to facilitate the removal of the tubular extension end 30 for purposes of repair or maintenance. An identical reference end body 31 is provided with a projection 32 received within each of the tubular extension ends 30 of the tubular extensions 26. The projection 32 may be slip fit, force fit or threaded to the extension end 30. The reference end body 31 of each of the tubular extension ends 30 includes an elongated reference element 33 provided with an axial slot 34. A resilient end ring 35 is retained within an annular end body groove 36 in each of the reference end bodies 31. The resilient end rings 36 prevent each of the tubular extensions 26 from being telescoped entirely within the main tubular member 24 due to the abutment of the resilient end ring 36 at each end of the main tubular member 24 at the open end portions 25 thereof.

An axial aperture 37 in each of the reference end bodies 31 rotatably receives an end body hook 38. Hook portions 40 on each of the end body hooks 38 open away from each other and have entrained thereabout an identical resilient band 41, constructed of rubber or other such similar flexible material. Each of the resilient bands 41 is retained wholly within the interior of its respective tubular extension 26, and is operatively connected to each other by a link member or chain 42 having identical hooks 43 at the ends thereof secured to an associated resilient band 41, as is clearly shown in FIGURE 6 of the drawings. The hooks 43 and 38, the resilient bands 28 and the link member or chain 24 form a spring-loaded joint between the identical tubular extensions 26 and the main tubular member 24 for a purpose to be hereinafter discussed.

Two identical contact bodies 44 and 45 are slidably mounted on the main tubular member 24. Since the contact bodies 44 and 45 are identical, a description of the construction of the contact body 44 is considered sufficient for a thorough understanding of this invention.

Figures 3, 4, 5:
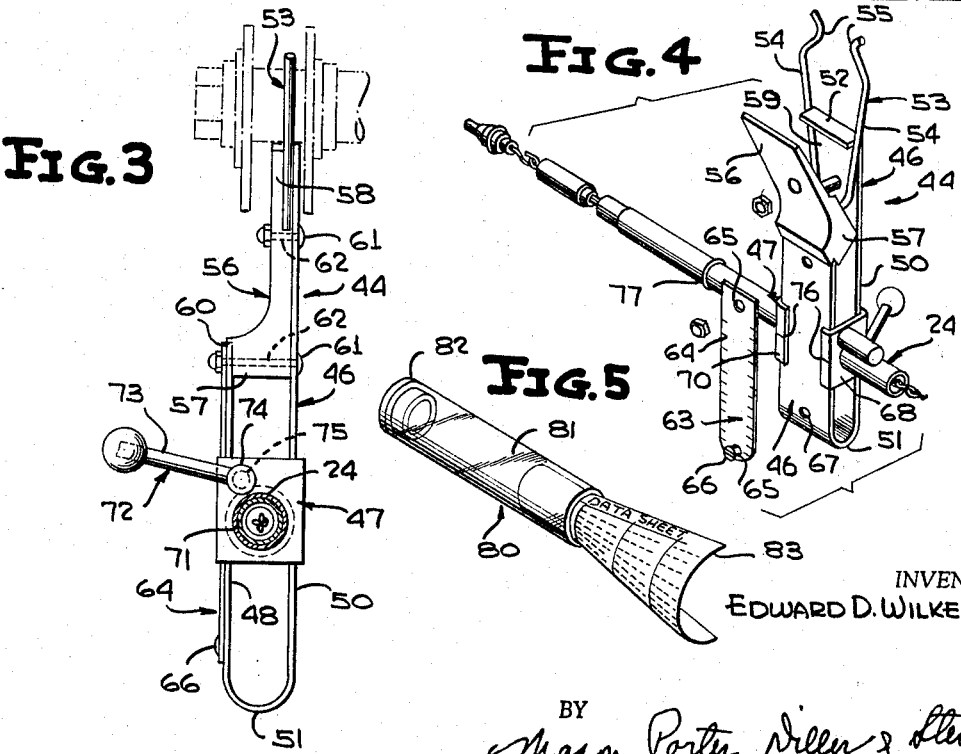
FIGURE 4 is a fragmentary exploded perspective view in side elevation of a leftmost portion of the torsion bar height guage shown in FIGURE 2, and illustrates the relationship between the contact body, the main tubular member, the tubular extension and the reference element at an end thereof.
FIGURE 5 is a top perspective view of a transparent tubular data-carrying member, and shows a data sheet partially inserted within the tubular data-carrying member.

With particular attention directed to FIGURES 2 through 4 of the drawings, the contact body 44 includes a first body portion 46 and a second body portion 47.

The first body portion 46 of the contact body 44 is of a generally U-shaped configuration and includes a short leg 48, an elongated leg 50 and a bight portion 51. The elongated leg 50 includes an inwardly directed flange 52. An upwardly opening, substantially V-shaped finger-gripping spring 53 contacts an internal face 59 of the elongated leg 50 and straddles the inwardly directed flange 52 thereof. Each of a pair of legs 54 of the finger-gripping spring 53 is provided with an inwardly directed finger-gripping portion 55. A spring clamping body 56 having a relatively thick lower portion 57 narrowing upwardly into a relatively thin upper portion 58 is positioned between the legs 48 and 50 in overlying relationship to the legs 54 of the finger-gripping spring 53 and underlying the inwardly directed flange 52. A shoulder portion 60 of the lower thickened portion 57 of the spring clamping body 56 overlies the leg 48 at an upper end thereof. A pair of threaded bolts 61 inserted through apertures 62 in the first body portion 46 of the contact body 44 immovably secures together the legs 48 and 50, the spring clamping body 56 and the finger-gripping spring 53 in a manner clearly illustrated in FIGURE 3 of the drawings.

A height gauge plate 63 provided with a plurality of graduations 64 and apertures 65 is secured to the leg 48 of the U-shaped first body portion 46 by the lowermost of the bolts 61 shown in FIGURE 3 and a screw 66 threadedly engaging an aperture 67 in the leg 48.

The second body portion 47 of the contact body 44 includes a U-shaped member having opposed plates 68 and 70 in face-to-face relationship with each other. A pair of identical, aligned, circular apertures 71 in the plates 68 and 70 slidably receive the main tubular member 24. The legs 48 and 50 of the U-shaped first body portion 46 are telescopically and slidably received between the plates 68 and 70 of the second body portion 47. As is clearly shown in FIGURE 3 of the drawings, the main tubular member 24 passes between the legs 48 and 50 of the first body portion 46, thereby permitting the first body portion 46 to be moved vertically with respect to the second body portion 47. The upward vertical movement of the first body portion 46 with respect to the second body portion 47 is limited by the contact between the bight portion 51 of the first body portion 46 and the main tubular member 24. The downward vertical movement of the first body portion 46 is similarly limited by the abutment of the lower thickened portion 57 of the spring clamp body 56 against the main tubular member 24.

The body portions 46 and 47 of the contact body 44 are retained in a preselected position by means of a clamping mechanism 72. The clamping mechanism or member 72 includes a handle 73 secured to a clamping bolt 74 which in turn is passed through a pair of axially aligned apertures 75 in the plates 68 and 70. The apertures 75 in the plate 70 is threaded (not shown) and receives a threaded end portion (not shown) of the clamping bolt 74. In this manner, when the handle 73 is moved from the position shown in FIGURE 3 to the position illustrated in FIGURE 4, the clamping plates 68 and 70 are drawn toward each other and clamp the legs 48 and 50 of the U-shaped first body portion 46 therebetween. A pair of reference index notches 76 in the plates 68 and 70 cooperate with the graduations 64 on the height gauge plate 63 in a manner to preselect and preset a desired torsion bar height as will hereinafter be more fully explained.

With particular attention directed to FIGURES 2 and 6 of the drawings, a plurality of rubber retaining rings or grommets 77 are flexibly maintained in a plurality of peripheral grooves 78 in the main tubular member 24. The purpose of the retaining rings 77 is to limit the sliding movement of each of the contact bodies 44 and 45 upon the main tubular member 24.

Slidably mounted on the main tubular member 24 between the contact bodies 44 and 45 is a transparent tubular data-carrying member 80. The transparent tubular data carrying member 80 is best illustrated in FIGURES 2, 5 and 6 of the drawings, and includes a transparent body 81. The transparent body 81 is tubular and made of polyethylene or a similar durable, non-frangible material. A pair of identical axially apertured journalling members 82 are press fit into the interior of the transparent body 81 of the data-carrying member 80. A data sheet 83 is housed within the transparent tubular body 81. The data sheet 83 cooperates with the transparent tubular body 81 to form a tubular chart for a purpose to be more fully discussed hereinafter. The data-carrying member 80 is freely slidable on and revolvable about the main tubular member 24, but limited in its sliding movement thereon by a pair of the rubber retaining rings 77 as shown in FIGURES 2 and 6.

Because the torsion bars of an automobile are gauged by the torsion bar height gauge of this invention when the automobile is supported on the wheels thereof, the automobile must be "conditioned" for gauging by filling the gas tank thereof, inflating the tires to the recommended pressure, removing all luggage therefrom and normalizing the automobile by jouncing. The automobile is jounced by merely grasping a bumper at its center and "working" the car up and down several times.

Depending upon the automobile and model, the torsion bar height gauge 14 must be set to a preselected torsion bar height. To more fully explain the operation of the torsion bar height gauge 14, the setting and operation of the torsion bar height gauge 14 will be discussed by describing the steps necessary to test the torsion bar heights of a 1957 Chrysler 300.

To set the torsion bar height gauge 14, the automobile, model and year is located from the information on the data sheet 83 of the tubular transparent data-carrying member 80. In this example, the data-carrying member 80 is rotated upon the main tubular member 24 until "1957 Chrysler 300" is found. The data sheet 83 has a "key letter" for each particular automobile, and the key letter for the 1957 Chrysler 300 is "G." The plurality of key letters on the data sheet 83 each have a corresponding graduation on the height gauge plate 63 of the first body portion 46 of the contact body 44, as well as the contact body 45.

A graduation of the plurality of graduations 64 on the height gauge plate 63 is then aligned with the reference index notches 76 on the second body portion 47. For the 1957 Chrysler 300, the "G" graduation on the height gauge plate 63 is aligned with the reference index notches 76 at which time the handle 72 of the clamping bolt 74 is moved from the position shown in FIGURE 3 to the position shown in FIGURE 4, thereby locking the body portions 46 and 47 in relation to each other. The contact body 45 of the torsion bar height gauge 14 is similarly identically set.

The torsion bar height gauge 14 is then attached to a sprung weight front end portion of the automobile. For example, as is best illustrated in FIGURE 2 of the drawings, the contact bodies 44 and 45 are slide along the main tubular member 24 until the finger-gripping springs 53 of each contact body is aligned with the torsion bars 17 of the automobile. The finger-gripping springs 53 are merely snapped upon the torsion bars 17, or if the torsion bars are enclosed, the finger-gripping springs 53 are snapped on the torsion bar housings. The contact bodies 44 and 45 are then moved toward the front side of the lower control arms 16.

To determine whether the torsion bar heights of the automobile are accurate, one of the tubular extensions 26 is telescoped out of the main tubular member 24 until the reference element 33 is located at a lowermost edge portion of the rim lip 23, the rim lip 23 being a point of reference on the unsprung weight portion of the automobile. That is, when the reference element 33 of the tubular extension 26 is in alignment with a lowermost portion of the rim lip 23, the torsion bars 17 are of a correct height. If the reference element 33 of the torsion bar height gauge 14 shown in FIGURE 2 is either above or below a lowermost portion of the wheel rim lip 23, adjustment of the torsion bars 17 is required.

This above discussed procedure is done on both sides of the automobile, and the torsion bar heights of the automobile become readily apparent when the operator notes the alignment of each of the reference elements 33 with a respective lowermost portion of a rim lip 23. If the heights of the torsion bars 17 are inaccurate, the operator merely adjusts the same in a known manner by means of the fulcrum or adjusting levers 18 until the reference elements 33 and the lowermost rim lips 23 are aligned on each wheel of the automobile.

It should be noted that the spring-loaded connection between the tubular extensions 26 formed by the hooks 38 and 43, the resilient bands 41 and the link member or chain 42 perform two functions. Because of the flexure of the bands 41 the tubular extensions 26 are drawn away from the rim lips 23 when the operator releases the tubular extensions 24, thereby preventing accidental bending of the tubular extensions in the event that the reference elements 33 might otherwise become accidentally hooked onto the wheel rim lips 23 when the automobile is jounced in the aforementioned manner between successive gauging and settings of the torsion bars. In addition, the spring-loaded connection between the main tubular member 24 and the tubular extensions 26 maintain axial alignment between these respective tubular elements during the gauging operation thereby increasing the accuracy of the torsion bar height gauge. Furthermore, the symmetrical construction of the torsion bar height gauge 14 allows the same to be reversed 180° end-for-end to thereby check the accuracy of the torsion bar height gauge 14 as well as providing a recheck for the torsion bars which have been once tested.

A torsion bar height gauge 84 shown in FIGURES 7 through 9 of the drawings comprises an elongated main tubular member 85 telescopically received within a tubular extension 86. A clamping bolt 87, similar to the clamping bolt shown in FIGURE 11, secures the tubular members 85 and 86 together. An identical reference element 88, such as the reference element shown in FIGURE 11, is provided at the non-telescoped ends of the tubular elements 85 and 86, and performs the identical function as the reference elements 33 of FIGURES 2 and 6.

Each of a pair of identical stands 90 is provided with a gauge supporting bracket 91 adjustable on a vertical standard 92 of each of the stands 90. A set screw 93 threadably received in an apertured portion 94 of each of the gauge supporting brackets 91 clamps the same to its respective vertical standard 92. Each one of a pair of identical contact bodies 95 includes a first tubular body portion 96 telescopically receiving therein a second body portion 97. A magnetic insert 98 in the first body portion 96 attaches the contact body 95 to the torsion bar 17, while a second magnetic insert 100 in the second body portion 97 slidably attaches the contact body 95 to the main tubular member 84. A compression spring 101 is provided internally of the contact body 95 between the magnetic inserts 98 and 100 for biasing the second body portion 97 outwardly with respect to the first body portion 96. A shoulder 102 on the second body portion 97 is adapted to abut a peripheral flange 103 on the first body portion 96 to prevent the second body portion 97 from being withdrawn from the first body portion 96.

A plurality of graduations 104 on the second body portion 97 of each of the contact bodies 95 cooperate with the flange 103 of the first body portion 96 in a manner to be immediately described.

To use the torsion bar height gauge 84 the tubular members 85 and 86 are telescoped to span the distance between the wheel rim lips 23 and locked in this position by the set screw 87 as is clearly shown in FIGURE 7. The gauge supporting brackets 91 are then adjusted to align the reference elements 88 with a lowermost portion of the rim lip 23 at each end of the automobile. Thus, the wheel rim lips are utilized as a point of height reference. The contact bodies 95 are positioned between a respective torsion bar 17 and the main tubular member 85 of the torsion bar height gauge 84. The flange 103 of each of the first body portions 96 performs the function of the reference index marks 76 shown in FIGURE 5 and cooperates with the plurality of graduations 104 in a like manner. That is, any variation in the heights of the torsion bars 17 is indicated on the graduations on the contact bodies 95.

It should be noted that each of the first body portions 96 of the contact bodies 95 is provided with a set screw 105. The set screws 105 of the contact bodies 95 perform two functions. First, when the torsion bar height gauge 84 is not being used, the second body portion 97 may be fully telescoped within the first body portion 96 and locked therein by the set screw 105.

Furthermore, the set screws 105 may be used to preset the contact bodies 95 in the same manner as the contact bodies 44 and 45 of FIGURE 2 are preset. In this manner the torsion bar is freely suspended from the torsion bars 17 and the gauge supporting stands 90 may be eliminated. The heights of the torsion bars 17 may then be determined by the torsion bar height gauge 84 in a manner identical to that described in relation to the torsion bar height gauge 14.

A torsion bar height gauge 106 shown in FIGURE 10 of the drawings is substantially identical to the torsion bar height gauge 84 of FIGURE 7. The torsion bar height gauge 106 differs from the torsion bar height gauge 84 in that a tubular extension 107 of the latter gauge is provided with a substantially broad reference element 108. The reference element 108 is clearly illustrated in FIGURE 11. Because the torsion bar height gauge 106 is supported directly upon a lowermost inturned pair of rim lips 23, the reference elements 108 thereof are integrally formed on the end portions of the height gauge 106 to provide firm support for the height gauge 106 when in use.

A pair of contact bodies 110 of the torsion bar height gauge 106 are substantially identical to the contact bodies 95 of the torsion bar height gauge 84. However, each of the contact bodies 110 is devoid of a spring, such as the spring 101 illustrated in FIGURE 9, and further lacks an abutment shoulder and flange, similar to the shoulder 102 and flange 103 of the contact body 95.

The torsion bar height gauge 106 is operated in a manner identical to the torsion bar height gauge 84 except that the torsion bar height gauge 106 is directly supported upon the rim lips 23 by the broad reference elements 108. It should also be noted that the set screws 95 of the contact bodies 110 may be used to preset the contact bodies 110 in a manner similar to the presetting of the contact bodies 44 and 45, and the height gauge 106 may then be freely suspended from the torsion bars 17 without being supported by the wheel rim lips 23. When used in this manner, the magnetic inserts 98 and 100 of the contact bodies 110 provide the sole support for the torsion bar height gauge 106.

While example disclosures of torsion bar height gauges are shown herein, it is to be understood that changes in the disclosed structures and arrangements may be made without departing from the spirit and scope of the invention as defined in the appended claims.

I claim:

1. A torsion bar height gauge comprising an elongated main tube, a tubular extension telescoped at least at one end of said main tube, said tube and extension being rotatable relative to each other, a reference element at one end of the tubular extension providing a reference point adapted for alignment with wheel rim lips, a pair of contact bodies in spaced apart contacting relationship with the main tube, each of the contact bodies including a first portion having first securing means at one end thereof adapted to secure the associated contact body to a torsion bar of a vehicle, a second portion of each of said contact bodies being adjustable upon the associated first portion, means for clamping each of the first portions to its associated second portion and a plurality of graduations on one of the aforesaid portions cooperative with a reference index on the other of the portions whereby the first and second portions of each contact body may be adjusted with respect to each other and secured in a preselected adjusted position by the clamping means.

2. The torsion bar height gauge as defined in claim 1 wherein second securing means are provided on each of said second portions of said clamping bodies for securing said second portions to the elongated main tube.

3. A torsion bar height gauge comprising an elongated main tube, a tubular extension telescoped upon said main tube at each end thereof, a reference element at each of the non-telescoped ends of the tubular extensions adapted to provide reference points alignable with a wheel rim lip, a pair of contact bodies, each of said contact bodies including first and second telescoped portions, said first portions being provided with first securing means at one end thereof adapted for attachment to an automobile torsion bar, said second portions being provided with second securing means adapted for slidably mounting each of the second portions upon the main tube, and clamping means for maintaining respective first and second portions of each of said contact bodies in a preselected position.

4. The torsion bar height gauge as defined in claim 3 wherein the first securing means comprises a spring clip and means are provided on the main tube for limiting the sliding movement of the second portion of each contact body upon the main tube.

5. The torsion bar height gauge as defined in claim 3 wherein means are provided for maintaining each of said tubular extensions biased towards each other.

6. The torsion bar height gauge as defined in claim 3 wherein a plurality of graduations are provided on the first portion of each contact body and a reference index is provided on the second portion of each contact body, any one of said plurality of graduations being prepositionable with respect to an associated reference index.

7. The torsion bar height gauge as defined in claim 3 wherein the first securing means comprises a spring clip adapted to attach each end of the contact bodies to an automobile torsion bar and the main tube is grooved for the reception of retainer elements at each side of the contact bodies thereby limiting the sliding movement of the contact bodies upon the main tube.

8. The torsion bar height gauge as defined in claim 7 wherein means are provided for maintaining each of said tubular extensions biased towards each other, said last mentioned means being elongated and located internally of the main tube and the tubular extensions.

9. The torsion bar height gauge as defined in claim 8 wherein said last mentioned means are secured between said tubular extensions.

10. A torsion bar height gauge comprising an elongated main tube, a tubular extension telescoped at least at one end of said main tube, said tube and extension being rotatable relative to each other, a reference element at one end of the tubular extension and at the other end of the main tube providing reference points adapted for alignment with wheel rim lips, a pair of contact bodies in spaced apart contacting relationship with the main tube, each of the contact bodies including a first portion having first securing means at an end thereof adapted to secure the associated contact body to a torsion bar of a vehicle, a second portion of each of said clamping bodies being adjustable upon the associated first portion, means for clamping each of the first portions to its associated second portion and a plurality of graduations on one of the aforesaid portions cooperative with a reference index on the other of the portions whereby the first and second portions of each contact body may be adjusted with respect to each other and secured in a preselected adjusted position by the clamping means, said first and second portions being telescoped one within the other, said second portions each including second securing means for attaching the main tube thereto.

11. The torsion bar height gauge as defined in claim 10 wherein the said reference elements are constructed to seat upon wheel rim lips whereby the wheel rim lips are utilized as a height reference.

12. The torsion bar height gauge as defined in claim 10 wherein said first and second securing means are magnets.

13. The torsion bar height gauge as defined in claim 10 wherein spring means are housed in each of said contact bodies for biasing a respective portion of each contact body toward the main tube.

14. A torsion bar height gauge comprising an elongated main tube, a tubular extension telescoped at least at one end of said main tube, said tube and extension being rotatable relative to each other, a reference element at one end of the tubular extension and at the other end of the main tube providing reference points adapted for alignment with wheel rim lips, a pair of contact bodies in spaced apart contacting relationship with the main tube, each of the contact bodies including a first portion having securing means at an end thereof adapted to secure the associated contact body to a torsion bar of a vehicle, a second portion of each of said clamping bodies being adjustable upon the associated first portion, means for clamping each of the first portion to its associated second portion and a plurality of graduations on one of the aforesaid portions cooperative with a reference index on the other portions whereby the first and second portions of each contact body may be adjusted with respect to each other and secured in a preselected adjusted position by the clamping means, said first and second portions being telescoped one within the other, said second portions each including second securing means for attaching the main tube thereto, and wherein auxiliary support means are provided for maintaining the reference points at the end of the main tube and the tubular extension in alignment with the wheel rim lip of an automobile.

15. The torsion bar height gauge as defined in claim 14 wherein said support means are adjustable to compensate for variations in the heights of the wheel rim lips of an automobile caused by uneven surface contour.

16. The method of utilizing the sprung and unsprung weight portions of an automobile to determine torsion bar height comprising the steps of presetting a gauge prior to supportingly attaching the gauge to an automobile, attachnig the gauge to and supporting the gauge from a sprung weight portion of an automobile, utilizing rim lips of front wheels of the automobile as a reference height and comparing the reference height of the rim lips with a deviation in the height of the sprung weight portion by the gauge to determine the torsion bar height in reference to the wheel rim lips.

17. The method of utilizing the sprung and unsprung weight portions of an automobile to determine torsion bar height comprising the steps of utilizing rim lips of front wheels of an automobile as first points of reference, selecting a sprung portion of an automobile as a second point of reference, presetting a gauge prior to supportingly attaching the gauge to an automobile to reflect a known distance, attaching the gauge to and supporting the gauge from a sprung weight portion of an automobile, and gauge comparing the distance between the first and second points of reference with the known distance to determine the correct height of automobile torsion bars.

18. The method of utilizing the sprung weight front end portion of an automobile and the front wheel rim lip of an automobile to determine the height of torsion bars forming a part of the sprung weight front end portion and thereby facilitating the correction of torsion bars of inaccurate heights comprising the steps of providing a gauge having end reference points and presettable height gauging portions, presetting a selected height on the height gauging portions of the gauge, securing the height gauging portions of the gauge to the sprung weight front end portion of an automobile and gauge comparing the sprung weight front end portion by the deviation of the end reference points from the front wheel rim lips.

19. A torsion bar height gauge comprising a gauge body including an elongated main member, an extension mounted for axial movement relative to said main member at least at one end portion thereof, a reference element at opposite ends of the gauge body adapted to provide reference points alignable with a wheel rim lip, a pair of contact bodies, each of said contact bodies including first and second relatively movable portions, said first portions being provided with first securing means at one end thereof adapted for attachment to an automobile torsion bar, at least one of said second portions being provided with second securing means for slidably mounting said second portions upon the gauge body, and clamping means for maintaining respective first and second portions of at least one of said contact bodies in assembled relationship.

20. A torsion bar height gauge comprising a gauge body including an elongated main member, an extension mounted for axial movement relative to said main member at least at one end portion thereof, said main member and said extension being freely rotatable relative to each other, a reference element at opposite ends of the gauge body adapted to provide reference points alignable with a wheel rim lip, a pair of contact bodies, each of said contact bodies including first and second relatively movable portions, said first portions being provided with first securing means at one end thereof adapted for attachment to an automobile torsion bar, at least one of said second portions being provided with second securing means for slidably mounting said at least one second portion upon the gauge body, and clamping means for maintainging respective first and second portions of at least one of said contact bodies in assembled relationship.

21. The torsion bar height gauge as defined in claim 19 wherein resilient means are provided for maintaining the reference elements coaxial to the main tube and said last-mentioned means are constructed and arranged for returning the reference elements to a coaxial position at any time the main tube and reference elements are misaligned.

References Cited by the Examiner

UNITED STATES PATENTS

| | | | |
|---|---|---|---|
| 728,763 | 5/1903 | Ritsch | 33—143 |
| 1,560,521 | 11/1925 | Andrews | 33—193 |
| 2,285,965 | 6/1942 | Halstead | 33—203.18 |
| 2,552,178 | 5/1951 | James | 33—203.2 |
| 2,900,734 | 8/1959 | Richards | 33—203.18 X |
| 3,108,382 | 10/1963 | Vorpahl | 33—180 X |
| 3,111,773 | 11/1963 | Hunter | 33—193 X |

LEONARD FORMAN, *Primary Examiner.*

ISAAC LISANN, *Examiner.*

N. F. MARTIN, S. S. MATTHEWS,
*Assistant Examiners.*